(12) United States Patent
Jönsson et al.

(10) Patent No.: US 10,023,714 B2
(45) Date of Patent: Jul. 17, 2018

(54) POROUS POLYMERIC SEPARATION MATERIAL

(71) Applicant: Biotage AB

(72) Inventors: Stig Jönsson, Lund (SE); Ecevit Yilmaz, Bjärred (SE); Sanja Beyowich, Mölndal (SE)

(73) Assignee: Biotage AB, Uppsala (SE)

( * ) Notice: Subject to any disclaimer, the term of this patent is extended or adjusted under 35 U.S.C. 154(b) by 107 days.

(21) Appl. No.: 15/274,287

(22) Filed: Sep. 23, 2016

(65) Prior Publication Data

US 2017/0009041 A1  Jan. 12, 2017

Related U.S. Application Data

(62) Division of application No. 13/321,279, filed as application No. PCT/SE2010/050536 on May 18, 2010.

(30) Foreign Application Priority Data

May 19, 2009 (SE) ...................... 0900673

(51) Int. Cl.
| | |
|---|---|
| C08J 9/36 | (2006.01) |
| B01D 15/00 | (2006.01) |
| B01J 20/26 | (2006.01) |
| B01J 20/28 | (2006.01) |
| A23L 5/20 | (2016.01) |
| B01J 20/22 | (2006.01) |

(52) U.S. Cl.
CPC ................ *C08J 9/36* (2013.01); *A23L 5/273* (2016.08); *B01D 15/00* (2013.01); *B01J 20/223* (2013.01); *B01J 20/26* (2013.01); *B01J 20/261* (2013.01); *B01J 20/267* (2013.01); *B01J 20/28057* (2013.01); *B01J 20/28059* (2013.01); *B01J 20/28069* (2013.01); *B01J 20/28071* (2013.01); *B01J 20/28073* (2013.01); *B01J 20/28076* (2013.01); *B01J 20/28083* (2013.01); *A23V 2002/00* (2013.01); *C08J 2205/042* (2013.01); *C08J 2325/02* (2013.01)

(58) Field of Classification Search
CPC ................................................. C08J 2205/042
See application file for complete search history.

(56) References Cited

U.S. PATENT DOCUMENTS

| | | | | |
|---|---|---|---|---|
| 3,979,280 | A * | 9/1976 | Dielacher | ................ C07C 7/12 585/827 |
| 4,042,498 | A | 8/1977 | Kennedy | |
| 4,652,280 | A | 3/1987 | Boeren et al. | |
| 5,558,893 | A | 9/1996 | Muraldihara | |
| 2002/0158015 | A1 | 10/2002 | Jumppanen et al. | |
| 2004/0202870 | A1 | 10/2004 | Kim et al. | |
| 2008/0317701 | A1 | 12/2008 | Koike et al. | |
| 2009/0130411 | A1 | 5/2009 | Chang et al. | |
| 2012/0128842 | A1 | 5/2012 | Jonsson et al. | |

FOREIGN PATENT DOCUMENTS

| | | |
|---|---|---|
| EP | 0109915 A2 | 5/1984 |
| EP | 0109915 A3 | 5/1984 |
| EP | 0575121 A1 | 12/1993 |
| EP | 0914862 A1 | 5/1999 |
| JP | 61-28449 A | 2/1986 |
| WO | WO-0189653 A2 | 11/2011 |

OTHER PUBLICATIONS

Kazuharu Yoshizuka, Zhengrong Lou, Katsutoshi Inoue. Silver-complexed chitosan microparticles for pesticide removal. Reactive & Functional Polymers 44 (2000) 47-54. (Year: 2000).*
"Amberlite and Amberlyst Resins, Sigma Aldrich", Accessed Nov. 18, 2015 at <http://www.sigmaaldrich.com/chemistry/chemicalsynthesis/learningcenter/technicalbulletins/al142/amberliteamberlyst.html>, (2015).
"Amberlite XAD-2. Sigma Aldrich", Accessed Nov. 20, 2015 at <http://www.sigmaaldrich.com/catalog/product/supelco/10357?lang=en&region=US.>, (2015).
"U.S. Appl. No. 13/321,279, Advisory Action dated Aug. 12, 2016", 6 pgs.
"U.S. Appl. No. 13/321,279, Final Office Action dated May 25, 2016", 9 pgs.
"U.S. Appl. No. 13/321,279, Non Final Office Action dated Dec. 3, 2015", 12 pgs.
"U.S. Appl. No. 13/321,279, Preliminary Amendment filed Dec. 5, 2011", 6 pgs.
"U.S. Appl. No. 13/321,279, Response filed Mar. 3, 2016 to Non Final Office Action dated Dec. 3, 2015", 11 pgs.
"U.S. Appl. No. 13/321,279, Response filed Jul. 25, 2016 to Final Office Action dated May 25, 2016", 8 pgs.
"U.S. Appl. No. 13/321,279, Response filed Oct. 15, 2015 to Restriction Requirement dated Aug. 27, 2015", 6 pgs.
"U.S. Appl. No. 13/321,279, Restriction Requirement dated Aug. 27, 2015", 8 pgs.
"European Application Serial No. 10778017.3, Extended European Search Report dated Apr. 1, 2015", 8 pgs.
"European Application Serial No. 10778017.3, Office Action dated Apr. 17, 2015", 1 pg.
"European Application Serial No. 10778017.3, Response filed Oct. 27, 2015 to Office Action dated Apr. 17, 2015", 12 pgs.

(Continued)

*Primary Examiner* — Michael M Dollinger
*Assistant Examiner* — Christina H Wales
(74) *Attorney, Agent, or Firm* — Schwegman Lundberg & Woessner, P.A.

(57) ABSTRACT

The present invention relates to a mesoporous polymeric separation material comprising one or more functional groups bound to metal ions from Cu, Zn, Ag, or Pd. Methods of producing the material, as well as methods for its preparation, and use of said material in separation of pesticides from food or feed products is disclosed.

3 Claims, No Drawings

(56) References Cited

OTHER PUBLICATIONS

"International Application Serial No. PCT/SE2010/050536, International Search Report dated Sep. 13, 2010", 4 pgs.
"International Application Serial No. PCT/SE2010/050536, Written Opinion dated Sep. 13, 2010", 5 pgs.
Baggiani, Claudio, et al., "Solid phase extraction of food contaminants using molecular imprinted polyers", Analytica Chimica Acta, 591, (2007), 29-39.
Filippov, O. A, et al., "Dynamic Preconcentration of Organic Substances on Nonpolar Adsorbents", Journal of Analytical Chemistry, 58(5), (2003), 398-422.
Kumar, et al., "Metal ion enrichment with Amberlite XAD-2 functionalized with Tiron: analytical applications", Analyst, vol. 125, (May 2000), 1221-1226.
Kyriakopoulos, G., et al., "Adsorption of pesticides on resins", Journal of Environmental Science and Health—Part B Pesticides, Food Contaminants, and Agricultural Wastes, 38(2), (2003), 157-168, 1178-1184.
Vergli, I, et al., "Removal of 2, 4-D, MCPA and Metalaxyl from water using Lewatit VP OC 1163 as sorbent", Desalination, 249(3), (2009), 1107-1114.
Yoshizuka, Kazuhara, et al., "Silver-complexed chitosan microparticles for pesticide removal", Reactive & Functional Polymers, 44, (2000), 47-54.

* cited by examiner

POROUS POLYMERIC SEPARATION MATERIAL

PRIORITY APPLICATIONS

This application is a continuation of U.S. application Ser. No. 13/321,279, filed 6 Feb. 2012, which is a U.S. National Stage under 35 U.S.C. 371 from International Application No. PCT/SE2010/050536, filed on 18 May 2010, and published as WO2010/134877 on 25 Nov. 2010, which claims the benefit of priority of Swedish Application No. 0900673-5, filed on 19 May 2009; which applications and publication are incorporated herein by reference in their entirety.

TECHNICAL FIELD OF THE INVENTION

The present invention relates to the design, preparation and use of novel resins comprising one or more metal complexes. These new resins are selective towards one or more analytes/targets that are not satisfactorily separated by conventional chromatographic materials.

BACKGROUND ART

In the area of separation materials, there are a family of resins that contain metal ligands. The majority of these are aimed at the separation of proteins. Examples of conventional commercial resins are Sephadex (GE Healthcare), BioGel (BioRad) and Toyopearl (Tosoh). These conventional resins generally have a low cross-linking degree and a flexible backbone structure, and comprise large pores. The large pores are optimized for analytes such as proteins but none of the mentioned conventional materials offers a satisfactory solution for certain types of small molecules. Conventional chelate materials that have been developed for small molecules, such as Purolite® chelation resins, are conventionally used for the separation of small molecules that interact with metal ions. Said materials sometimes lead to poor separations, low selectivity and unsatisfactory resolutions for certain applications areas. Othermetal chelate resins, such as Dowex 50WX8, Amberlite® CG50, Amberlite® IR-120, Amberlyst® 15, although widely used do not always perform satisfactorily when used for demanding separations, such as pesticides and other environmental contaminants present at low concentrations in complex matrices.

The use of silver-loaded cation exchangers for purifying and separating unsaturated small molecules, e.g. fatty acids, pheromones and polyaromatic sulphur-containing heterocycles, has been described and such resins have been used in column chromatography systems for analytical and preparative purposes. Within the food industry it is generally a requirement that food raw materials, components or products are not contaminated by metals during processing.

Several studies described in the literature have shown that the hydrolysis reactions of pesticides may be catalysed by metals in an aqueous environment. However, hydrolysis does not completely solve the problem of removing the pesticides as it does not remove the hydrolysis products that are formed.

Ridvan Say in Anal. Chim. Acta 579 (2006) 74-80 discloses molecularly imprinted polymers prepared using paraoxan or parathion as template and methacryloyl-antipyrine-gadolinium chelate as a monomer.

Removal of pesticides from food is a major focus within the food industry and there is increasing public concern over the level of pesticide residues in food. U.S. Pat. No. 5,558,893 discloses a distillation method for contaminated citrus oils that can be used for the preparation of citrus oils that are essentially pesticide free. However, distillation generally has an adverse effect on the flavor of the citrus oils since numerous volatile compounds that impart flavor and taste are simultaneously removed.

Removal and adsorption of fungicides and herbicides in aqueous solution on modified activated carbon is used for purifying pharmaceutical oil, refineries as well as pesticides as disclosed in Separation and Purification Technology, Vol 52, Issue 3, January 2007, Pages 403-415.

Pesticides are not only a problem in citrus oils but are present in many other essential oils (e.g. palm oil). Consequently there is a need for materials and methods for selectively removing, extracting, separating and/or analysing pesticides from food and feed products, such as essential oils.

SUMMARY OF THE INVENTION

One object of the present invention is to provide a porous separation material for selective extraction and/or separation of pesticides.

One object of the present invention is achieved by a porous polymeric separation material characterized by containing pores in the mesoporous region; having a surface area above 50 $m^2$/g material and a pore volume between 0.2 and 1.2 ml/g material, as determined by BET analysis, and the material comprises one or more functional group(s) bound to one or more metal ion(s) selected from the group consisting of $Cu^+$, $Ag^+$, $Pd^{2+}$, $Cu^{2+}$ or $Zn^{2+}$.

In one aspect the porous polymeric separation material is a copolymer of divinylbenzene and styrene substituted with one or more functional group(s) selected from the group consisting of sulphonic acid and carboxylic acid; or a copolymer of divinylbenzene and a polymerisable tertiary alkylamine.

One object of the present invention is achieved by a method of preparing a porous polymeric separation material by
  providing a functional monomer, a cross-linking monomer, optionally an initiator, and a porogen;
  polymerizing;
  obtaining a porous polymeric material;
  contacting said porous polymeric material with one or more metal ion(s) selected from the group consisting of $Cu^+$, $Ag^+$, $Pd^{2+}$, $Cu^{2+}$ or $Zn^{2+}$; and
  obtaining a porous polymeric separation material.

One object is in one aspect achieved by the method above wherein the functional monomer is selected from the group consisting of vinylbenzenesulphonic acid, such as 4-vinylbenzenesulphonic acid; vinylbenzyliminodiacetic acid, such as 4-vinylbenzyliminodiacetic acid; polymierzable derivatives of tertiary alkylamines; or a combination or salts thereof; and/or the cross-linking monomer is selected from divinylbenzene, ethylene glycol dimethacrylate, trimethylolpropane trimethacrylate or any combination thereof.

One object of the present invention is achieved by a method of separating a pesticide from a food or feed product by contacting the food or feed product with a porous polymeric separation material according to the invention.

In one aspect the method of separating a pesticide from a food or feed product further comprises forming a ternary complex between the porous polymeric separation material and the pesticide; collecting the purified food or feed product; and eluting said pesticide.

DETAILED DESCRIPTION OF THE PREFERRED EMBODIMENTS

The present invention relates to a porous polymeric separation material (resin). The resin is a porous polymeric material and consequently not a gel material.

The resins are specifically useful in separation of pesticides. The resins are selective towards one or more target molecule(s) and allow entrapment, separation, extraction and/or analysis, such as chromatographic analysis, of target compounds that are not satisfactorily separated by conventional methods or material. The target molecule is a pesticide.

The present invention relates to a porous polymeric separation material characterized by containing pores in the mesoporous region; having a surface area above 50 m$^2$/g material and a pore volume between 0.2 and 1.2 ml/g material, as determined by BET analysis and the material comprises one or more functional group(s) bound to one or more metal ion(s) selected from the group consisting of Cut, Ag$^+$, Pd$^{2+}$, Cu$^{2+}$ or Zn$^{2+}$.

In one embodiment said metal ion is selected from Ag$^+$, and Pd$^{2+}$. In one embodiment said metal ion is Ag$^+$. It is possible to use two or more different metal ions selected from Cu$^+$, Ag$^+$, Pd$^{2+}$, Cu$^{2+}$ or Zn$^{2+}$ in a resin of the invention.

The surface area of the porous separation material is in one embodiment >50 m$^2$/g material.

The surface area of the porous separation material is in one embodiment >300 m$^2$/g material, such as between 300 and 700 m$^2$/g material; in one embodiment the pore surface area is >400 m$^2$/g material, such as between 400 and 700 m$^2$/g material.

The porous polymeric separation material is prepared having a degree of cross-linking density above 20 weight %, based on total weight % of added cross-linking monomer.

The resin of the invention has a pore volume between 0.2 and 1.2 ml/g material. In one embodiment the pore volume is between 0.2-0.9 ml/g material, such as 0.3-0.9 ml/g material and 0.4-0.8 ml/g material. In certain aspects the different intervals disclosed result in preferred resins.

The pores of the material are in the mesoporous region. Mesoporous means pores with diameters between 2 and 50 nm. In one embodiment the pores in the mesoporous region have a pore surface area >50 m$^2$/g material determined by BET analysis. The pore surface area is in one embodiment >300 m$^2$/g material, such as between 300 and 700 m$^2$/g material; in one embodiment the pore surface area is >400 m$^2$/g material, such as between 400 and 700 m$^2$/g material.

In one embodiment the resin has a capacity between 0.2 and 1.0 mmol/g material. The capacity is determined by detaching the metal ion from the resin by ion-exchange, for example by washing with a suitable solvent, such as an aqueous sodium nitrate solution or aqueous nitric acid solution and anhydrous methylamine. A more specific description of the procedure is disclosed in Example 6.

In one embodiment the capacity is 0.3-0.8 mmol/g material and in one embodiment the capacity is 0.35-0.6 mmol/g material.

The resin is a copolymer of divinylbenzene and styrene substituted with one or more functional group(s) selected from the group consisting of sulphonic acid and carboxylic acid; or a copolymer of divinylbenzene and a polymerisable tertiary alkylamine.

A metal complex is a binary complex between a functional group attached to a polymeric support bound, for example coordinated, to a metal ion. The resin comprises one or more functional group(s) selected from the group consisting of sulphonic acid, carboxylic acid and tertiary alkylamine.

The tertiary alkylamines are tertiary amines defined by NR$^1$R$^2$R$^3$ wherein R$^1$ is a polymerizable group such as a vinyl group, a vinylbenzyl group etc, R$^2$ and R$^3$ are independently of each other selected from heteroaryl-C$_{1-6}$-alkyl and amino-C$_{1-6}$-alkyl, optionally substituted by a straight or branched C$_{1-6}$-alkyl. Heteroaryl means an aryl groups comprising one or more nitrogen atom.

The functional group is generally introduced by the functional monomer, and suitable functional monomers are for example vinylbenzenesulphonic acid, such as 4-vinylbenzenesulphonic acid; vinylbenzyliminodiacetic acid, such as 4-vinylbenzyliminodiacetic acid; polymierzable derivatives of tertiary alkylamines, such as amino acids, bipyridyl, terpyridyl and pyridyl. In some embodiments vinylbenzenesulphonic acid, such as 4-vinylbenzenesulphonic acid is preferred.

Cross-linking monomers may be selected from divinylbenzene, ethylene glycol dimethacrylate, trimethylolpropane trimethacrylate or any other hydrophobic monomer or combination thereof. In some embodiments divinylbenzene or combinations of divinylbenzene and other cross-linking monomers are preferred.

In one embodiment it is preferred to use vinylbenzenesulphonic acid, such as 4-vinylbenzenesulphonic acid, as functional monomer, and divinylbenzene or combinations of divinylbenzene and other cross-linking monomers as cross-linking monomer.

Initiatiors may be selected from azo initiator such as 2,2'-azobis(2-methylpropionitrile) (AIBN) or 2,2'-azobis(2,4-dimethylvaleronitrile) (ABDV) or a peroxide iniator such as benzoyl peroxide or tert-butyl peroxide or any other radical initiator. Polymerization may be initiated thermally or by irradiation with UV light.

Furthermore, the metal ion in the binary complex is able to coordinate a third species (target molecule, i.e. pesticide) which results in a ternary complex. The term chelate is reserved for complexes in which the metal ion is bound to two or more atoms of the chelant, e.g. iminodiacetic acid, but within the context of the present application also complexes of sulphonic acid are included. The stability of the binary or ternary complexes is stoichiometrically driven and the bonds are reversible, i.e. addition of a target molecule with high equilibrium constant for the reaction will release a target molecule that is more weakly bonded. The retention of a given species on the adsorbent is related to the stability of the ternary complex.

The degree of cross-linking of the porous polymeric separation material is dependent on the amount of the cross-linking monomer used during polymerization. Consequently the cross-linking density refers to the weight % of cross-linking agent in the pre-polymerization mixture (functional monomer, cross-linking agent, optionally initiator). The degree of cross-linking of the polymeric separation material is above 20 weight % cross-linking monomer.

The materials of the invention are characterized by having high surface area and pore volume as discussed above. Additionally the resins are highly cross-linked polymeric networks, resulting in a rigid structure. The rigid structure of the resins according to the invention enables good theretomechanical properties and the materials thus may withstand severe experimental conditions.

The polymeric material forms strong binary complex between the metal and the functional monomer in order to minimize metal leakage into the food matrix. Further, the ternary metal complex (functional monomer, metal, and complex species) need to be strong enough to "trap" the species e.g. pesticide molecule on the immobilized support. The understanding of complex stability (Chem. Rev. 1989, 89, 1875-1914) is based on the principle of hard/soft acids and hard/soft bases. According to this concept a soft base, such as sulphur in organo-thiophosphate interact stronger with a soft acid, such as silver, compared to hard acids.

Example of metals acting as soft acids are $Cu^+$, $Ag^+$, $Pd^{2+}$, $Pt^{2+}$ and the "borderline acids" $Fe^{2+}$, $Cu^{2+}$, $Zn^{2+}$.

If the stability constant between functional group and metal is low, the result may be that a binary complex between the metal and species migrates and elutes with the elution (leakage). The amount of metal may suitably be determined by means of atom adsorption spectroscopy (AAS). The stability constants for binary complex with silver are e.g. (log K): sulphonic—Ag=5.6 (stability constant between sulphonic group and silver ion), iminodiacetic—Ag=4.3 (stability constant between sulphonic group and silver ion) and for thiol—Ag=13.6 (stability constant between sulphonic group and silver ion) (Martell, A. E.; Smith, R. M. Critical Stability Constants; Plenum: New York, 1989). The ternary complex can be broken by adding a molecules that compete with the metal coordination (generally referred to in the literature as ligand-exchange chromatography), which result in successive release of the absorbed species depending on their relative stability constants. In some cases, quantitative detachment of the metal is preferable, e.g. for regeneration of the column, which besides the metal also completely liberates the absorbed species. This can be achieved by adding an acid (e.g. diluted $HNO_3$ or aqueous sodium nitrate). The porous polymeric separation material (resin) of the invention is obtained providing a functional monomer, a cross-linking monomer, optionally an initiator, and a porogen; polymerizing; obtaining a porous polymeric material; contacting said porous polymeric material with one or more metal ion(s) selected from the group consisting of $Cu^+$, $Ag^+$, $Pd^{2+}$, $Cu^{2+}$ or $Zn^{2+}$; and obtaining a porous polymeric separation material. In one embodiment the functional group is selected from the group consisting of vinylbenzenesulphonic acid, such as 4-vinylbenzenesulphonic acid; vinylbenzyliminodiacetic acid, such as 4-vinylbenzyliminodiacetic acid; polymierzable derivatives of tertiary alkylamines; or a combination or salts thereof; and/or the cross-linking monomer is selected from divinylbenzene, ethylene glycol dimethacrylate, trimethylolpropane trimethacrylate or any combination thereof.

In one embodiment the porous polymeric separation material is prepared by suspension polymerization.

The functional group is generally introduced by the functional monomer, and suitable functional monomers are for example vinylbenzenesulphonic acid, such as 4-vinylbenzenesulphonic acid; vinylbenzyliminodiacetic acid, such as 4-vinylbenzyliminodiacetic acid; polymierzable derivatives of tertiary alkylamines, such as amino acids, bipyridyl, terpyridyl and pyridyl. In some embodiments vinylbenzenesulphonic acid, such as 4-vinylbenzenesulphonic acid are preferred.

Cross-linking monomers may be selected from divinylbenzene, ethylene glycol dimethacrylate, trimethylolpropane trimethacrylate or any other hydrophobic monomer or any combination thereof. In some embodiments divinylbenzene or combinations of divinylbenzene and other cross-linking monomers are preferred.

In some embodiments it is preferred to use vinylbenzenesulphonic acid, such as 4-vinylbenzenesulphonic acid as functional monomer and divinylbenzene or combinations of divinylbenzene and other cross-linking monomers as cross-linking monomer.

Initiatiors may be selected from azo initiator such as 2,2'-azobis(2-methylpropionitrile) (AIBN) or 2,2'-azobis(2,4-dimethylvaleronitrile) (ABDV) or a peroxide iniator such as benzoyl peroxide or tert-butyl peroxide or any other radical initiator. Polymerization may be initiated thermally or by irradiation with UV light. Suitable porogens are known to the skilled person, non-limiting examples thereof are chloroform, toluene, benzyl alcohol, n-octanol, ethyl acetate and methyl isobutyl ketone or mixtures thereof.

The present invention relates to a porous polymeric separation material that may be tuned to selectively bind to pesticides. In one embodiment of the present invention the pesticide is selected from organophosphate or organo-thiophosphate pesticides.

Pesticides is a diverse group of chemicals comprising for example organophosphates, organo-thiophosphates; and aryl groups containing heteroatoms selected from nitrogen and sulphur, such as prochloroz.

In one embodiment of the present invention the pesticide is selected from organophosphate and/or organo-thiophosphates.

Organophosphates are esters of phosphoric acid and non-limiting examples thereof are parathion, ethion, malathion, methyl parathion, chlorpyrifos, diazinon, dichlorvos, phosmet, tetrachlorvinphos, fenthion, pyridapenthion, pirimiphos methyl and azinphos methyl.

One embodiment of the present invention relates to a porous polymeric separation material and/or a method of separating a pesticide from food or feed products, such as essential oils, for example citrus oil. Conventional extraction, separation chromatographic and/or distillation methods and materials therefore do not enable a satisfactory removal of certain pesticides. In some embodiments the present invention relates to methods for separation of organophosphates and/or organo-thiophosphates from essential oils such as citrus oils. In said methods the resin of the invention is used in order to obtain food or feed products essentially free from pesticides, in particular organophosphates pesticides and/or organo-thiophosphates pesticides. Essentially means that the product may contain small amounts, or impurities, of pesticide but that much of the pesticides are removed.

One embodiment relates to a method of separating a pesticide from a food or feed product by contacting the food or feed product with a porous polymeric separation material according to the present invention. In one embodiment the method further comprises forming a ternary complex between the porous polymeric separation material and the pesticide; collecting the purified food or feed product; and eluting said pesticide.

The porous polymeric separation material may be used as an adsorbent in separations and/or extraction processes.

A pesticide is a substance or mixture of substances used to kill a pest. Pesticide includes algicides, avicides, bactericides, fungicides, herbicides, insecticides, miticides, molluscicides, nematicides, rodenticides, virucides. Pesticides may be synthetic or biological pesticides. Non-limiting examples of pesticides are organophosphates or organo-thiophosphates; or any combination thereof.

Essential oils are volatile, generally concentrated, essences of plants, and may be found in a variety of plant parts, including but not limited to roots (as in vetiver); leaves (as in tea tree); flowers (as in rose); citrus fruits (as in bergamot) and seeds (as in cumin). Citrus oils, including oils from citrus, sweet orange, lemon, bergamot, mandarin, lime, tangerine and grapefruit, or any combination thereof, are examples of essential oils. The essential oils used in the invention may be mixtures of oils and may contain other constituents known to the skilled person such as impurities (other than pesticides), flavouring agent and/or other additives.

A solvent which can be used according to the invention for removal of the pesticides can be selected from the following groups: alkanes, ketones, ethers, esters, more suitable are the alkanes cyclohexane, pentane.

One embodiment of the invention relates to a porous polymeric separation material as described in one or more of the above mentioned embodiments used in separation of pesticides, such as pesticides containing organophosphates and/or organo-thiophosphates from food or feed products, such as essential oils. In one embodiment the essential oil is selected from citrus oil. Consequently the resin may be used in methods separating pesticides from matrices such as food or feed products.

Separation or separating is understood to include extraction, removal, trapping, entrapment, chromatography, etc.

One embodiment of the present invention relates to separating and/or purifying a pesticide from a food or feed product, wherein a pesticide is contacted with a porous polymeric separation material as described in one or more of the above mentioned embodiments According to the invention, the metal ion, e.g. silver, can after each step of attaching pesticides to the porous polymeric separation material, be detached by adding an acid (e.g. $HNO_3$) or base (e.g. anhydrous methylamine). The bound pesticides are thus released. The silver remains in solution and the extracted complexes can be separated by solvent extraction.

The material of the invention is characterized as a resin-supported metal complex. The resin morphology divided into two categories namely "macroporous" or "gel-type". Gel-type resins, have an amorphous crosslinked infinite network without any fine structure. These resins has low degree of crosslinking, typically 4-8%, but typically has large functional capacity in terms of e.g. exchange capacity. An example of this is Dowex 50WX8. This material is a widely used strong cationic resin for fine chemical and pharmaceutical column separations. Dowex 50WX8 is cross-linked with 8% divinylbenzene with benzenesulphonic acid functionality. Dowex 50WX8 is of gel-type with low or no porosity according to BET analysis and with high exchange capacity. The resin of the invention was compared before and after functionalization with a metal ion, example 7, and to Dowex 50WX8, a resin with high functional capacity, example 9.

From comparative examples such as example 7 one difference between a porous polymeric separation material of the invention and a non-functionalized polymer is that the break-through point (the point when target compounds start to run through a polymer, because they are not retained by it) is reached for non-functionalized polymer already after loading first portions of limonene, the major solvent component of many citrus oils.

From comparative example, example 9, break-through point is reached for gel-type material already after loading first portion of citrus oil, in contrast to the porous polymeric material of the invention.

Macroporous resins, contrary to gel-type resins, have a permanent well-developed porous structure, even in the dry state. These resins have typically a high degree of cross-linking, >10%. These materials have high surface areas in the dry state (typically ranging from 50 to 1000 $m^2/g$ measured by $N_2$ BET). The high surface area is associated with a well-developed macroporous network, with good accessibility by small molecules. It is known from e.g. chromatography that high surface area retain small molecules, e.g. pesticides, better than low surface area materials, due to the increased molecular interaction area of the support and the eluent. The pore volume influence the kinetics of the interaction. The authors speculate in that gel-type material, in spite of having higher exchange capacity, has weakened interaction force and consequently less ability and capacity to retain interacting small molecules.

The capacity of the resin is in this context, for a macroporous resin with high (unpolar) surface area, also depending on accessibility of small molecule to a highly polar metal complex. The metal binding capacity of the resin is measured by removal of the metal complex by e.g ion-exchange and quantitative determination of the bound metal ion concentration of the resin, see example 6. In the context of chromatographic performance, the metal resin material shows good performance capacity to bind small molecules with high stability constants, while small molecules with lower stability constants will partly eluate (chromatographic effects) and consequently show lower performance capacity of the metal resin. Chromatographic effects can be more or less pronounced in different matrix (example 7 and example 8). In example 10 and 13, different pesticides were tested to establish the applicability of the invention (not restricted to the examples) and shows that the resin has good ability to bind pesticides with structurally diverse formulas.

In chromatographic applications, the matrix mixture is contacted to the resin and slowly passed through a column, resulting in separation of the matrix constituents depending on equilibrium distribution of each compound between stationary and mobile phases.

In batch mode, the matrix mixture is in contact with the resin contained within a porous bag made of fabric or other material (tea bag). The bag is then immersed in the matrix mixture, solution or conditioned medium for an appropriate time, after which it is removed like a tea bag. Additionally batch mode may be performed without the use of a bag and then resin is suspended in the matrix mixture. The advantage of the method is that it provides for easy separation of the adsorbent and simplified processing. The method can be used for pesticides with affinity to the resin.

The enclosed examples clearly show that the porous polymeric separation material according to the invention works in removing pesticides from matrixes such as an essential oil. Examples 14 and 15 show that the resins of the invention, prepared in different particle sizes, are efficient in removing pesticides. Consequently the material is successful in achieving one of the objects of the invention, namely removing a pesticide from an essential oil.

Examples 7, 8, 9, 17, and 18 all show that polymers of the invention may be treated with a metal in order to obtain a porous polymeric separation material according to the invention. The examples disclose that the materials effectively remove pesticides such as ethion, malathion and parathion from essential oils.

In one embodiment of the present invention it is possible to minimize and/or eliminate the chromatographic effects during the extraction of pesticides using resins of the invention by increasing the height of material-bed in the extraction-column.

If the matrix containing the pesticides is of a complex constitution the separation performance may be affected. In one embodiment of the present invention the undesirable matrix effects are minimized and/or avoided as the matrix is diluted with certain organic solvents or limonene. For example, citrus/lemon oil diluted with cyclohexane and/or limonene improves binding of pesticides to the resin compared non-diluted citrus/lemon oil. This enables an improved separation of pesticides by the resin of the invention.

In one embodiment of the present invention the separation of matrixes having "high value"-constituents (fragrances, flavors and colors agents which are matrix-characteristic compounds that give value to the flavor-product) is improved. Said constituents may complicate the separation as these may bind to the resin. It has surprisingly been found that the selectivity of the separation may be improved by introducing washing steps, after loading the matrix that contained the pesticides, with various organic solvents, such as heptane and/or limonene. Thereby the application-area for extraction of pesticides may be extended to more complex matrixes.

The resin of the invention may be applied to analytical problems by using it in a sample treatment step prior to analysis. Also, it is possible to adapt this method to large-scale and industrial purposes.

The resin of the invention may be used in batch mode or in chromatography.

Wherever an interval is present it is intended to mean each individual number within the interval, as well as each possible subinterval within the interval, for example the interval from 0 to 50 comprises the subintervals from 2 to 10, from 25.1 to 25.5 and from 5 to 40 etc.

Wherever "one or more" is used in the present invention it is intended to include one or more, two or more, three or more etc.

EXAMPLES

Example 1

Water (100 mL) and tributylamine (7.4 g, 0.04 mol) followed by sulfuric acid (4.0 g, 0.04 mol) and then 4-vinylbenzenesulfonic acid sodium salt (8.4 g, 0.04 mol) were added to a bottle under stirring. Toluene (55 mL) was added and the 2-phase system stirred vigorously for 0.5 h, pH=1. The phases were easily separated and the toluene phase used without purification in the next step. A sample was concentrated for NMR analysis. NMR (CDCl$_3$, 500 MHz) δH 1.38 (t, 9H), 3.09-3.26 (m, 18H), 5.30 (d, 1H), 5.81 (d, 1H), 6.64-6.76 (m, 1H), 7.38-7.47 (m, 2H), 7.81-7.90 (m, 2H), 10.2-10.5 (bs, 1H).

Polyvinylalcohol (PVA) (Celvol 523) was dissolved in water (400 mL) at 90 C to form a 2% solution by weight, cooled to rt and then added to a suspension reactor. Divinylbenzene 80% technical grade (26 g, 0.2 mol) was added to the prepared toluene solution of 4-vinylbenzenesulfonic acid tributylamine salt (from example 1). Initiator, ABDV (V65, 2,2'-azobis(2,4-dimethylvaleronitrile) (0.6 g) was added to the toluene solution and nitrogen was bubbled through the solution. The PVA solution was charged to the reactor followed by the monomer solution.

The two-phase mixture was stirred for some minutes and the temperature was elevated to 50° C. and after 4-6 h raised to 65° C. The process was maintained overnight. The polymer was filtered using 20 μm sieves and carefully washed with water. The polymer was washed with 1 M H$_2$SO$_4$ for 0.5 h, and thereafter washed with about 400 ml water. The polymer was then washed in soxhlet with ethanol overnight, and dried to give 28.4 g polymer (83% yield). Particle size was determined to be 20-130 μm, and sieved by 20-90 μm filter, before metal loading. Titration of a sample of the polymer slurried in water with 1 M NaOH and phenolftalein as indicator shows 0.36 mmol sulfonic acid/g dry polymer.

Properties of the Hydrophobic Porous Polymeric Separation Material (BET Analysis):

| | |
|---|---|
| Average particle size (D[4,3]): | 61 μm |
| Surface area: | 602 m$^2$/g |
| Pore volume: | 0.88 mL/g |
| average pore diameter | 58.2 Å. |
| dV/dlog(D) Peak value from desorption pore plot | 120 Å |

Example 2—Comparative Example

Dowex 50WX8-400 resin (5 g) was slurried in 5% H$_2$SO$_4$ (1M) for 1 h, and then washed with water (400 mL), pH 5, followed by methanol (100 mL). Titration of a sample of the polymer slurried in water with 1 M NaOH and phenolftalein as indicator shows 2.3 mmol sulfonic acid/g polymer. The resin was loaded with silver in the same way as in example 5a.

Example 3—Synthesis of Resin with Iminodiacetic Acid Functionality

Iminodiacetic acid (4 g, 30 mmol) was dissolved in aqueous methanol (60 mL, 1:1) and sodium hydroxide (2 g, 50 mmol) was added. The solution was warmed to 60° C. and 4-vinylbenzyl chloride (5.4 g, 35 mmol) was added slowly. After half of the amount of the chloride was added, another 2 g of sodium hydroxide was added followed by addition of the remaining chloride. After 0.5 h at 60° C., the solution was cooled and washed with diethyl ether. The aqueous phase was acidified with conc HCl to pH 2.5, the crude product filtered off and purified by recrystallization from aqueous methanol. Yield 36%.

Preparation of Porous Polymeric Separation Material.

Water (200 mL) and 4-vinylbenzyliminodiacetic acid (10.0 g, 0.04 mol) followed by tri-n-octylamine (14.0 g, 0.04 mol) and then toluene (50 mL) and benzylalcohol (10 mL) were added to a bottle and stirred vigorously for 0.5 h. The phases were easily separated and the organic phase used without purification in the next step.

Polyvinylalcohol (PVA) (Celvol 523) was dissolved in water (400 mL) at 90 C to form a 2% solution by weight, cooled to rt and then added to a suspension reactor. Divinylbenzene 80% technical grade (26 g, 0.2 mol) was added to the prepared solution of 4-vinylbenzyliminodiacetic trioctylamino salt (from above example). Initiator, ABDV (V65, 2,2'-azobis(2,4-dimethylvaleronitrile) (0.6 g) was added to the toluene solution and nitrogen was bubbled through the solution. The PVA solution was charged to the reactor followed by the monomer solution.

The two-phase mixture was stirred for some minutes and the temperature was elevated to 50° C. and after 4-6 h raised to 65° C. The process was maintained overnight. The polymer was filtered using 20 μm sieves and carefully washed with water. The polymer was washed with 1 M $H_2SO_4$ for 0.5 h, and thereafter washed with about 400 ml water. The polymer was then washed in soxhlet with ethanol overnight, and dried. Particle size was determined to be 20-130 μm.

The material was loaded with silver in same manner as in example 1. Detachment of the silver shows 0.21 mmol Ag/g dry resin.

Example 4—Synthesis of Bis(2-pyridylmethyl)-4-vinylbenzylamine

2-Picolyl chloride hydrochloride (4.1 g, 25 mmol) and 4-vinylbenzyl amine (1.6, 12 mmol) were dissolved in water (30 mL) and heated to 60° C. To this solution was added aqueous sodium hydroxide (10 mL, 5M) over a period of 0.5 h and then stirred for an additional hour. The cooled solution was extracted with dichloromethane and the extract dried and the solvent evaporated. The product was obtained as a viscous brown oil (3.4 g, 84%).

Preparation of Porous Polymeric Separation Material.

Polyvinylalcohol (PVA) (Celvol 523) was dissolved in water (400 mL) at 90 C to form a 2% solution by weight, cooled to rt and then added to a suspension reactor. Divinylbenzene 80% technical grade (26 g, 0.2 mol) was added to the prepared solution of bis(2-pyridylmethyl)-4-vinylbenzylamine (0.02 mol) (from above example). Initiator, ABDV (V65, 2,2'-azobis(2,4-dimethylvaleronitrile) (0.6 g) was added to the toluene solution and nitrogen was bubbled through the solution. The PVA solution was charged to the reactor followed by the monomer solution.

The two-phase mixture was stirred for some minutes and the temperature was elevated to 50° C. and after 4-6 h raised to 65° C. The process was maintained overnight. The polymer was filtered using 20 μm sieves and carefully washed with water. The polymer was washed with about 400 ml water followed by 100 ml Methanol. The polymer was then washed in soxhlet with ethanol overnight, and dried. Particle size was determined to be 40-130 μm.

The material was loaded with silver in same manner as in example 1.

Example 5

Loading the porous polymeric separation material with various metal ions.

Example 5a—Loading with $Ag^+$ 8 g dry polymer, prepared as disclosed in example 1, was slurried with 20 ml MeOH. After 1 h $AgNO_3$ (1.0 g, 6 mmol) dissolved in 2 ml water was added. After 1 h, the polymer was washed with methanol 20 ml, water 50 ml and methanol 50 ml and dried. Theoretical 0.36×169.9=61.2 mg $AgNO_3$ per gram polymer.

Example 5b—Loading with $Ag^+$ 10 g dry polymer, from example 1, was slurried in 30 ml methanol. After 5 min the resin was washed with water. The resin was then slurried in 40 ml water and poured into a flash column (internal diameter 20 mm). 1.5 g silver nitrate solved in 100 ml water (acidified with 1 drp HNO3) was slowly passed through the column (app 6-8 h). The material was washed with distilled water (100 ml) followed by methanol (100 ml) and then dried in vacuum oven.

Example 5c—Loading with $Cu^{2+}$ 10 g dry polymer, from example 1, was slurried in 30 ml methanol. After 5 min the resin was washed with water. The resin was then slurried in 40 ml water and poured into a flash column (internal diameter 20 mm). $CuCl_2$ (1.4 g, 10 mmol) was solved in 100 ml water (pH 5). was slowly passed through the column (app 6-8 h). The material was washed with distilled water (100 ml) followed by methanol (100 ml) and then dried in vacuum oven.

A sample (2.4 g) was treated with 2M HCl (30 ml) during 1 h. The greenish water was evaporated to dryness. 157 mg Cu $Cl_2$/2.4 g resin=65.4 mg $CuCl_2$ (0.49 mmol)/g resin.

Example 5d—Loading with $Cu^+$ 10 g dry polymer, from example 1, was slurried in 30 ml of aqueous acetonitrile (15:85). After 5 min the resin was poured into a flash column (internal diameter 20 mm). Copper(I)chloride CuCl (2.0 g, 20 mmol) solved in 100 ml aqueous acetonitrile (15:85) under nitrogen and allowed to settle before adding to the column. The metal solution was slowly passed through the column (app 6-8 h). The material was washed with distilled water (30 ml) followed by methanol (30 ml) and then dried in vacuum oven.

A sample was treated with 2 M HCl (30 ml) during 1 h. The washing water was evapoarated to dryness, green solid residue. 144.6 mg/2.1 g resin=69 mg (0.70 mmol/g resin).

Example 5e—Loading with $Pd^{2+}$ 1.0 g dry polymer, prepared as disclosed in example 1 (up to loading), was slurried in 3 ml methanol. After 5 min the resin was washed with water. The resin was then slurried in 4 ml water and poured into a flash column (internal diameter 10 mm). $PdCl_2$ (0.6 g, 3 mmol) was solved in 10 ml water (pH 5). was slowly passed through the column (app 6-8 h). The material was washed with distilled water (10 ml) followed by methanol (10 ml) and then dried in vacuum oven.

Example 5e—Loading with $Zn^{2+}$ 10 g dry polymer, from example 1, was slurried in 30 ml methanol. After 5 min the resin was washed with water. The resin was then slurried in 40 ml water and poured into a flash column (internal diameter 20 mm). $ZnCl_2$ (2.0 g, 15 mmol) was solved in 100 ml water (pH 5) was slowly passed through the column (app 6-8 h). The material was washed with distilled water (10 ml) followed by methanol (100 ml) and then dried in vacuum oven.

In some of the above mentioned examples the resin(s) is further washed and such further washings steps may for example include washing with ethyl acetate, heptane, acetonitrile and cyclohexane. The necessity of washing step and washing solvent are within the ability of the skilled person to determine.

Example 6—Detachment of Metal a) 0.5 g resin prepared according example 5a was washed with 5 ml 33% $MeNH_2$ in EtOH (Ethanol)+5 ml MeOH (methanol) under 0.5 h. The eluent was evaporated, app 20 mg brown residue. The residue was dissolved in 50 g water+2 drp conc HNO$_3$ and the amount of silver determined by atomic absorption spectroscopy (AAS) to be 67 mg AgNO$_3$/g resin; or b) 1.0 g dry resin prepared according example 5b was placed in a filtration funnel. 20 ml of a 0.5M aq. sodium nitrate solution was slowly passed through the funnel (app 0.5-1 h). App 2 ml of 1 M sodium chloride solution was added to eluated nitrate solution. The resulting silver chloride was allowed to preciptate during 4 h and was then collected, washed and dried at 130 C during 1 h. Gravimetric analysis of collected solid shows 51.0 mg.

Example 7—Loading Test from Limonene, Comparison Between Resin of the Invention and Non-Functionalized Polymer Standard/loading solution: Parathion, malathion and ethion in limonene, 25 µg/ml Solution of internal standard: Pyrene in ethyl acetate, 50 mg/ml 200 mg of:
Polymer prepared according to Example 5a, treated with silver
DVB sulphonic acid-polymer (NFP, non-functionalized polymer, prepared according to Example 1 but without the final metal treatment) was separately packed in 3 ml SPE-cartridges (two per material).

1 ml of standard solution was loaded 10 times on each SPE-column and 10 fractions were collected per column. 50 µl of internal standard was added to each collecting glass-tube and solvent was evaporated before GC-MS-analysis, in order to increase the concentration-levels of samples. The result can be seen in Table 1. Wherein the numbers in the first column relate to 1 ml-aliqouts added in 10 respectively 5 consecutive steps on respective polymer.

TABLE 1

| | % Unretained pesticides from limonene | | |
|---|---|---|---|
| | Ethion | Malathion | Parathion |
| Polymer load 1 | 0 | 0 | 3 |
| Load 2 | 0 | 0 | 3 |
| Load 3 | 0 | 0 | 0 |
| Load 4 | 0 | 0 | 0 |
| Load 5 | 0 | 0 | 0 |
| Load 6 | 0 | 0 | 0 |
| Load 7 | 0 | 0 | 0 |
| Load 8 | 0 | 0 | 0 |
| Load 9 | 0 | 0 | 0 |
| Load 10 | 0 | 0 | 1 |
| NFP load 1 | 0 | 0 | 0 |
| Load 2 | 19 | 35 | 76 |
| Load 3 | 41 | 77 | 118 |
| Load 4 | 61 | 89 | 105 |
| Load 5 | 77 | 74 | 128 |

The results of the example clearly show that the polymeric separation material according to the invention, example 5a, efficiently removes (0% unretained) pesticides from limonene, while same material without metal treatment (NFP) did not retain pesticides as efficiently.

Example 8—Loading Test from Lemon Oil

Standard/loading solution: Parathion, malathion and ethion in lemon oil, 25 µg/ml Solution of internal standard: Pyrene in ethyl acetate, 50 µg/ml 200 mg polymer prepared in example 5a was packed in 3 ml SPE-cartridge.

1 ml of standard solution was loaded 6 times on each SPE-column and 6 fractions were collected. 50 µl of internal standard was added in each collecting glass-tube and solvent was evaporated before collecting fractions in order to increase the concentration-levels of samples for analysis on GC-MS. The results are disclosed in Table 2.

TABLE 2

| Loading | % of Unretained Pesticides from Lemon Oil | | |
|---|---|---|---|
| volume, ml | Ethion | Malathion | Parathion |
| Polymer load 1 | 0 | 23 | 1 |
| Load 2 | 0 | 16 | 13 |
| Load 3 | 0 | 12 | 15 |
| Load 4 | 0 | 18 | 13 |
| Load 5 | 0 | 14 | 12 |
| Load 6 | 0 | 16 | 5 |

The results show that the polymeric separation material according to the invention, example 1, shows good ability to retain pesticides in essential oils represented in this experiment by commercially available lemon oil.

Example 9—Loading Test from Citrus Oil, Comparison Between Resin of the Invention and DOWEX-Polymer Commercial Material 1:
200 mg of DVB sulphonic acid-polymer (commercial DOWEX 50 W X 8-400; 38-75 µm), treated with silver ion was packed in 3 ml SPE-cartridges, example 2.

Material 2:
200 mg of polymer prepared in example 1; 20-90 µm, treated with silver ion, as disclosed in example 5a, was packed in 3 ml SPE-cartridges.

1 ml of standard solution in four various diluting systems was loaded five times and all fractions were collected separately.

50 µl of internal standard was added in each collecting glass-tube and solvent was evaporated before collecting fractions in order to increase the concentration-levels of samples for analysis on GC-MS. Results are disclosed in table 3.

TABLE 3

| Loading | % Unretained pesticides | | |
|---|---|---|---|
| volume, ml | Ethion | Malathion | Parathion |
| (citrus oil) 1/Commercial material 1 | 87 | 89 | 92 |
| 2 | 97 | 102 | 103 |
| 3 | 91 | 98 | 110 |
| 4 | 87 | 90 | 99 |
| 5 | 90 | 104 | 103 |
| (citrus oil) 1/ Material 2 | 2 | 11 | 16 |
| 2 | 3 | 18 | 23 |
| 3 | 2 | 39 | 47 |
| 4 | 0 | 10 | 49 |
| 5 | 2 | 25 | 86 |

The results show that the polymeric separation material according to the invention, example 5a, (material 2) shows superior capacity to retain pesticides, compared to material 1, in essential oils represented in this experiment by commercially available citrus oil.

Example 10—Extraction of Other Pesticides from Limonene

Standard/loading solution: Bromopropylate, Prochloraz, Fenthion, Methylparathion, Methylpyrimiphos and Pyridapenthion in limonene, 10 µg/ml Solution of internal standard: Pyrene in ethylacetate, 50 µg/ml 400 mg polymer prepared in example 5a was packed in 3 ml SPE-cartridge. 1 ml of standard solution was loaded 10 times on the SPE-column and fractions were collected. 50 µl of internal standard was added in each collecting glass-tube and solvent was evaporated before collecting fractions in order to increase the concentration-levels of samples for analysis on GC-MS.

TABLE 4

| Loaded volume, ml | % Unretained pesticides | | | |
|---|---|---|---|---|
| | Methyl parathion | Pirimiphos methyl | Fenthion | Pyridapenthion |
| 1 | 0 | 0 | 0 | 0 |
| 2 | 0 | 0 | 0 | 0 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| 7 | 0 | 0 | 0 | 0 |
| 8 | 0 | 0 | 0 | 0 |
| 9 | 0 | 0 | 0 | |
| 10 | 0 | 0 | 0 | |

The results show that the polymeric separation material according to the invention, example 5a, shows good ability to retain structurally different pesticides such as organothiophosphates (including e.g. heterocyclic derivatives).

Example 11

Preparation of ethion spiked grapefruit oil for 'tea bag extraction' and 'suspension extraction' experiments. Tea bags: polypropylene, pore size 50 µm. Weigh 40.8 milligrams of ethion in a glass vial. Transfer ethion using grapefruit oil to 1 liter of grapefruit oil. Mix thoroughly using magnetic stirrer for 15 minutes. The concentration of ethion in oil is 40.8 mg/L. Take 0.5 L of spiked grapefruit oil for 'tea bag extraction' and the other 0.5 L for 'suspension extraction' experiments.

Extraction Experiments

Take 0.5 L of grapefruit oil spiked with ethion to a concentration of 40.8 mg/L and add a 'tea bag' containing 1 gram of material of Example 5b. Continuously stir the oil on a magnetic stirrer. An aliquot of oil was periodically taken and analyzed for ethion over a period of 24 hours. Details of sampling times and the measured ethion concentration are shown in table 2. The oil was transferred to another container at the end of 24 hours period discarding the 'tea bag'.

TABLE 5

| Time from start of experiment - hours | Measured conc. of ethion - mg/L | % Ethion removed by material |
|---|---|---|
| 0.0 | 40.0 | |
| 0.6 | 23.0 | 44% |

TABLE 5-continued

| Time from start of experiment - hours | Measured conc. of ethion - mg/L | % Ethion removed by material |
|---|---|---|
| 1.3 | 18.0 | 56% |
| 1.8 | 14.2 | 65% |
| 2.6 | 10.9 | 73% |
| 3.4 | 8.7 | 79% |
| 3.9 | 7.5 | 82% |
| 4.4 | 6.3 | 84% |
| 4.9 | 5.5 | 87% |
| 5.5 | 5.3 | 87% |
| 6.0 | 4.2 | 90% |
| 8.3 | 3.0 | 93% |
| 24.0 | Nd | 100% | nd = <1.0 ppm

Example 12—Suspension Mode Extraction Experiments

Take 0.5 L of grapefruit oil spiked with ethion to a concentration of 40.8 mg/L and add 1 gram of material of example 5b directly into the grapefruit oil. Continuously stir the oil on a magnetic stirrer. An aliquot of oil was periodically taken and analyzed for ethion over a period of 24 hours. Details of sampling times and the ethion concentration measured are shown in table 3. At the end of 24 hours period, the oil is filtered using Munktell filter Paper #3.

TABLE 6

| Time from start of experiment (hours) | Ethion measured conc. in oil (mg/L) | % Ethion removed by material - 'suspension mode' |
|---|---|---|
| 0.0 | 40.0 | |
| 0.0 | 39.9 | |
| 0.6 | 22.1 | 46% |
| 1.3 | 17.4 | 57% |
| 1.8 | 14.5 | 65% |
| 2.6 | 10.3 | 75% |
| 3.4 | 7.5 | 82% |
| 3.9 | 6.7 | 83% |
| 3.9 | 6.2 | 85% |
| 4.4 | 5.1 | 88% |
| 4.9 | 4.7 | 89% |
| 5.5 | 5.1 | 88% |
| 6.0 | 4.3 | 89% |
| 8.3 | 2.6 | 94% |
| 24.0 | nd | 100% | nd = <1.0 ppm

Example 13—Removal of Pesticides from Grapefruit Oil 400 mg polymer prepared in example 5b was packed in 3 ml SPE-cartridge.

1 ml of standard solution was loaded 10 times on each SPE-column and 10 fractions were collected. 50 µl of internal standard was added in each collecting glass-tube and solvent was evaporated before collecting fractions in order to increase the concentration-levels of samples for analysis on GC-MS. The results are disclosed in Table 7.

TABLE 7

| Standard solution of grapefruit oil spiked with 25 ppm of respective pesticide | % Unretained pesticide | | | | | | |
|---|---|---|---|---|---|---|---|
| | Imazalil | Chlorpyriphos | Prochloraz | Methyl parathion | Bromo-propylate | Pirimiphos Methyl | Fenthion |
| 1 | 0 | 0 | 12 | 11 | 7 | 0 | 0 |
| 2 | 0 | 0 | 57 | 14 | 54 | 0 | 0 |
| 3 | 0 | 0 | 48 | 11 | 54 | 0 | 0 |
| 4 | 0 | 0 | 60 | 14 | 64 | 0 | 0 |
| 5 | 0 | 0 | 60 | 14 | 68 | 0 | 0 |
| 6 | 0 | 0 | 81 | 20 | 87 | 0 | 0 |
| 7 | 0 | 0 | 62 | 16 | 65 | 0 | 0 |
| 8 | 0 | 0 | 81 | 20 | 85 | 1 | 0 |
| 9 | 0 | 1 | 66 | 19 | 68 | 1 | 0 |
| 10 | 0 | 1 | 84 | 24 | 84 | 2 | 0 |

Example 14—Removal of Pesticides from Orange Oil 400 mg polymer prepared in example 5b prepared in order to obtain different particle sizes was packed in 3 ml SPE-cartridge.

1 ml of standard solution was loaded 10 times, containing 25 ppm of each pesticide, on each SPE-column and 10 fractions were collected. 25 μl of internal standard, pyrene solution (50 ppm), was added in each collecting glass-tube and solvent was evaporated before collecting fractions in order to increase the concentration-levels of samples for analysis on GC-MS. The results are disclosed in Table 8. Performance check of batches with different particle size in column mode (SPE)

TABLE 8

| Loading fraction per material | % Unretained pesticides | | |
|---|---|---|---|
| | Ethion | Malathion | Parathion |
| (244 μm); 1 | 0 | 0 | 0 |
| (244 μm); 2 | 0 | 0 | 0 |
| (244 μm); 3 | 0 | 0 | 0 |
| (244 μm); 4 | 0 | 0 | 2 |
| (244 μm); 5 | 0 | 3 | 3 |
| (244 μm); 6 | 0 | 0 | 1 |
| (244 μm); 7 | 0 | 0 | 2 |
| (394 μm); 1 | 4 | 16 | 11 |
| (394 μm); 2 | 1 | 6 | 4 |
| (394 μm); 3 | 0 | 3 | 2 |
| (394 μm); 4 | 0 | 2 | 3 |
| (394 μm); 5 | 1 | 5 | 8 |
| (394 μm); 6 | 0 | 3 | 4 |
| (394 μm); 7 | 0 | 2 | 12 |
| (108 μm); 1 | 0 | 0 | 0 |
| (108 μm); 2 | 0 | 0 | 0 |
| (108 μm); 3 | 0 | 0 | 0 |
| (108 μm); 4 | 0 | 0 | 0 |
| (108 μm); 5 | 0 | 0 | 0 |
| (108 μm); 6 | 0 | 0 | 0 |
| (108 μm); 7 | 0 | 0 | 0 |
| (130 μm); 1 | 0 | 0 | 0 |
| (130 μm); 2 | 0 | 0 | 0 |
| (130 μm); 3 | 0 | 0 | 0 |
| (130 μm); 4 | 0 | 0 | 0 |
| (130 μm); 5 | 0 | 0 | 0 |
| (130 μm); 6 | 0 | 0 | 1 |
| (130 μm); 7 | 0 | 0 | 1 |

Example 15—Removal of Pesticides from Lemon Oil 400 mg polymer prepared in example 5b prepared in order to obtain different particle sizes was packed in 3 ml SPE-cartridge.

1 ml of standard solution was loaded 10 times, containing 25 ppm of each pesticide, on each SPE-column and 10 fractions were collected. 25 μl of internal standard, pyrene solution (50 ppm), was added in each collecting glass-tube and solvent was evaporated before collecting fractions in order to increase the concentration-levels of samples for analysis on GC-MS. The results are disclosed in Table 9. Performance check of batches with different particle size in column mode (SPE)

TABLE 9

| Loading fraction per material | % Unretained pesticides | | |
|---|---|---|---|
| | Ethion | Malathion | Parathion |
| (244 μm); 2 | 0 | 0 | 0 |
| (244 μm); 2 | 0 | 0 | 0 |
| (244 μm); 3 | 0 | 0 | 0 |
| (244 μm); 4 | 0 | 0 | 0 |
| (244 μm); 5 | 0 | 0 | 22 |
| (244 μm); 6 | 0 | 2 | 30 |
| (244 μm); 7 | 0 | 3 | 29 |
| (394 μm); 1 | 2 | 20 | 37 |
| (394 μm); 2 | 0 | 2 | 20 |
| (394 μm); 3 | 4 | 21 | 42 |
| (394 μm); 4 | 0 | 5 | 35 |
| (394 μm); 5 | 3 | 16 | 55 |
| (394 μm); 6 | 1 | 12 | 56 |
| (394 μm); 7 | 0 | 9 | 54 |
| (108 μm); 1 | 0 | 0 | 0 |
| (108 μm); 2 | 0 | 0 | 0 |
| (108 μm); 3 | 0 | 0 | 0 |
| (108 μm); 4 | 0 | 0 | 0 |
| (108 μm); 5 | 0 | 0 | 0 |
| (108 μm); 6 | 0 | 0 | 0 |
| (108 μm); 7 | 0 | 0 | 0 |
| (130 μm); 1 | 0 | 0 | 0 |
| (130 μm); 2 | 0 | 0 | 0 |
| (130 μm); 3 | 0 | 0 | 0 |
| (130 μm); 4 | 0 | 0 | 0 |
| (130 μm); 5 | 0 | 0 | 0 |
| (130 μm); 6 | 0 | 0 | 0 |
| (130 μm); 7 | 0 | 0 | 0 |
| (60 μm); 1 | 0 | 0 | 0 |
| (60 μm); 2 | 0 | 0 | 0 |
| (60 μm); 3 | 0 | 0 | 0 |

TABLE 9-continued

| Loading fraction per material | % Unretained pesticides | | |
|---|---|---|---|
| | Ethion | Malathion | Parathion |
| (60 μm); 4 | 0 | 0 | 0 |
| (60 μm); 5 | 0 | 0 | 0 |
| (60 μm); 6 | 0 | 0 | 0 |
| (60 μm); 7 | 0 | 0 | 0 |

Example 16—Loading Test from Lemon Oil 400 mg polymer prepared in example 3 prepared in order to obtain different particle sizes was packed in 3 ml SPE-cartridge.

1 ml of standard solution was loaded 10 times, containing 25 ppm of each pesticide, on each SPE-column and 10 fractions were collected. 25 μl of internal standard, pyrene solution (50 ppm), was added in each collecting glass-tube and solvent was evaporated before collecting fractions in order to increase the concentration-levels of samples for analysis on GC-MS. The results are disclosed in Table 10.

TABLE 10

| Loading fraction per material | % Unretained pesticides | | |
|---|---|---|---|
| | Ethion | Malathion | Parathion |
| 1 | 0 | 0 | 28 |
| 2 | 0 | 0 | 29 |
| 3 | 0 | 0 | 27 |
| 4 | 0 | 0 | 81 |
| 5 | 0 | 0 | 93 |
| 6 | 0 | 0 | 79 |
| 7 | 0 | 0 | 78 |
| 8 | 0 | 0 | 91 |
| 9 | 0 | 0 | 95 |
| 10 | 0 | 0 | 95 |

Example 17—Loading Test from Lemon Oil 400 mg polymer prepared in example 5e.

1 ml of standard solution was loaded 10 times, containing 25 ppm of each pesticide, on each SPE-column and 10 fractions were collected. 25 μl of internal standard, pyrene solution (50 ppm), was added in each collecting glass-tube and solvent was evaporated before collecting fractions in order to increase the concentration-levels of samples for analysis on GC-MS. The results are disclosed in Table 11.

TABLE 11

| Loading fraction per material | % Unretained pesticides | | |
|---|---|---|---|
| | Ethion | Malathion | Parathion |
| 1 | 1 | 0 | 0 |
| 2 | 1 | 0 | 0 |
| 3 | 1 | 0 | 0 |
| 4 | 1 | 0 | 0 |
| 5 | 1 | 0 | 0 |
| 6 | 8 | 0 | 0 |
| 7 | 1 | 0 | 0 |

Example 18—Loading Test from Lemon Oil 400 mg polymer prepared in examples 5c, 5d and 5f prepared in order to obtain different particle sizes was packed in 3 ml SPE-cartridge.

1 ml of standard solution was loaded 10 times, containing 25 ppm of ethion, on each SPE-column and 10 fractions were collected. 25 μl of internal standard, pyrene solution (50 ppm), was added in each collecting glass-tube and solvent was evaporated before collecting fractions in order to increase the concentration-levels of samples for analysis on GC-MS. The results are disclosed in Table 12.

TABLE 12

| Loading fraction | % Unretained Ethion |
|---|---|
| Cu-polymer_1 | 2 |
| Cu-polymer_2 | 26 |
| Cu-polymer_3 | 55 |
| Cu-polymer_4 | 58 |
| Cu-polymer_5 | 52 |
| Cu-polymer_6 | 60 |
| Cu-polymer_7 | 55 |
| Cu(I)-polymer_1 | 68 |
| Cu(I)-polymer_2 | 20 |
| Cu(I)-polymer_3 | 5 |
| Cu(I)-polymer_4 | 4 |
| Cu(I)-polymer_5 | 23 |
| Cu(I)-polymer_6 | 35 |
| Cu(I)-polymer_7 | 35 |
| Zn-polymer_1 | 2 |
| Zn-polymer_2 | 48 |
| Zn-polymer_3 | 60 |
| Zn-polymer_4 | 61 |
| Zn-polymer_5 | 60 |
| Zn-polymer_6 | 61 |
| Zn-polymer_7 | 61 |

The invention claimed is:

1. A method for separating pesticides comprising contacting pesticides with a porous non-gel polymeric separation material containing pores in the mesoporous region about 2-50 nm in diameter; having a degree of crosslinking above about 20 wt-%; having a total surface area of about 300-700 m$^2$/g material and a pore volume between 0.2 and 1.2 ml/g material, as determined by BET analysis, wherein the material comprises one or more functional groups bound to Ag$^+$ ions at a Ag+ binding capacity of about 0.2-1 mmole Ag+/g of material; and wherein the pesticides are organophosphates or organothiophosphates.

2. The method according to claim 1, wherein said one or more functional groups are selected from the group consisting of sulphonic acid, carboxylic acid and tertiary alkylamine.

3. The method according to claim 1, wherein the porous polymeric separation material comprises a copolymer of divinylbenzene and styrene substituted with one or more functional groups selected from the group consisting of sulphonic acid and carboxylic acid or comprises a copolymer of divinylbenzene and a polymerisable tertiary alkylamine.

* * * * *